Patented Sept. 10, 1940

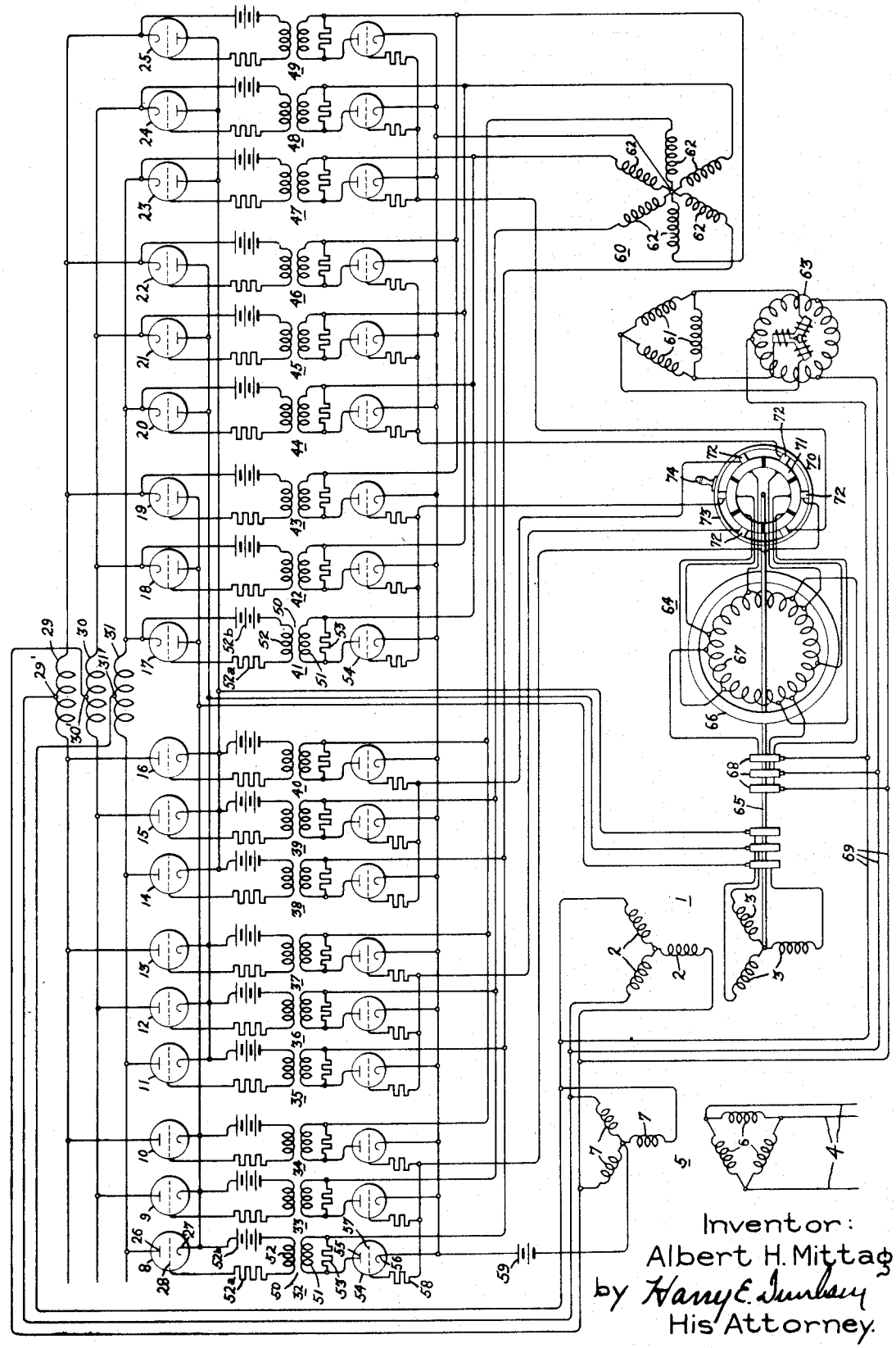

2,214,563

UNITED STATES PATENT OFFICE 2,214,563

ELECTRIC VALVE MOTOR CONTROL SYSTEM

Albert H. Mittag, Schenectady, N. Y., assignor to General Electric Company, a corporation of New York Application October 19, 1937, Serial No. 169,828
Renewed January 30, 1940

8 Claims. (Cl. 172—237)

My invention relates to electric valve circuits and more particularly to electric valve circuits for controlling dynamo-electric machines. More specifically, my invention relates to an improvement in the type of electric valve control apparatus disclosed and broadly claimed in a copending patent application of E. F. W. Alexanderson, Serial No. 169,843 filed concurrently herewith and assigned to the assignee of the present application.

Electric valve translating circuits have been found to offer many advantages in the control of dynamo-electric machines. In many of the prior art arrangements, including electric valves for this purpose, it has been necessary to use considerable auxiliary control equipment such as mechanical or electro-mechanical switching devices to obtain the desired operation of the electric valves. Particularly has this been true in connection with the control of dynamo-electric machines of the induction type where it is desired to effect transmission of power between an alternating current supply circuit and a rotor winding of the induction machine and where it is necessary to control the transfer of power in accordance with two electrical conditions such as the voltage of the associated supply circuit and the voltage or the current of the rotor winding. In view of the many and diversified advantages available by the use of electric valve translating apparatus in motor control systems, it has become evident that there is a decided need for improved control circuits for the electric valve translating apparatus whereby there is afforded the requisite degree of precision and flexibility of control without sacrificing durability and reliability of the control system.

It is an object of my invention to provide a new and improved electric valve translating system.

It is another object of my invention to provide a new and improved electric valve system for dynamo-electric machines.

It is a further object of my invention to provide a new and improved electric valve control system for dynamo-electric machines of the induction type.

In accordance with the illustrated embodiment of my invention, I provide a control system for electric valve translating apparatus which transmits power to or receives power from a rotor winding of a dynamo-electric machine of the induction type which is energized from an associated alternating current supply circuit. The electric valve translating apparatus includes a plurality of electric valve means having control members for controlling the conductivities of the electric valves and which are arranged to permit the transfer of power in either direction between the supply circuit and the rotor winding of the induction machine. The electric valves are arranged to permit the operation of the induction machine as a motor or as an induction generator either above or below synchronous speed. The control system also permits the induction machine to be operated in synchronism with the voltages established by the associated supply circuit. A plurality of excitation circuits are associated with the electric valve means for controlling the energization of the control members conjointly in accordance with the voltage of the supply circuit and in accordance with the slip frequency voltage of the induction machine. Each of the excitation circuits includes a control electric valve which is provided with a control member. The anode-cathode voltages of the control electric valves vary in accordance with the voltage of the alternating current supply circuit and a suitable periodic voltage of a frequency corresponding to the slip frequency voltage of the induction machine is impressed on the control member of the control electric valve. In this manner the control members of the main or power electric valves are energized in accordance with the voltage of the supply circuit and in accordance with the slip frequency voltage. A frequency changing dynamo-electric machine which is mechanically connected to the rotor of the induction machine produces alternating voltages of a frequency corresponding to the slip frequency voltage of the induction machine. The frequency changing dynamo-electric machine is provided with a winding having alternating current terminals and a commutator having associated brushes which produce the slip frequency control voltages.

For a better understanding of my invention, reference may be had to the following description taken in connection with the accompanying drawing and its scope will be pointed out in the appended claims. The single figure of the accompanying drawing diagrammatically illustrates my invention as applied to a dynamo-electric machine of the induction type in which the machine is capable of operation either as a motor or as a generator below or above synchronous speed.

Referring now to the single figure of the drawing, there is diagrammatically illustrated an embodiment of my invention for controlling a dynamo-electric machine 1 of the induction type having stator or inducing windings 2 and rotor or induced windings 3. The stator windings 2 are connected to an alternating current supply circuit 4 through a transformer 5 having primary windings 6 and secondary windings 7. Electric translating apparatus is connected between the supply circuit 4 and the rotor windings 3 of machine 1 to permit the transfer of power in either direction therebetween. The translating apparatus includes a plurality of electric valve means 8—25 which are preferably of the type employing an ionizable medium such as a gas or a vapor, and each includes an anode 26, a cathode 27 and a control member 28. While for the purpose of explaining my invention I have chosen to represent the electric valves as being of the type employing an anode, a cathode and a control member within an envelope, it is to be understood that certain valves of this group having cathodes at a common potential may be replaced by electric valve means of the type employing a plurality of anodes and associated control members and a single cathode. Current smoothing reactances 29—31 are connected between various groups of the electric valves and are provided with electrically intermediate connections 29', 30' and 31', respectively which are connected to the alternating current supply circuit 4 through transformer 5. It will be noted that the electric valves 8—25 are connected to the rotor windings 3 in a manner to permit the transfer of power in either direction between circuit 4 and rotor windings 3. Furthermore, it will be noted that electric valves 8—16 are oppositely disposed relative to electric valves 17—25. That is, the former group of electric valves transmits current to the rotor windings 3, and electric valves 17—25 transmit current from rotor windings 3 to transformer 5. Furthermore, it will be noted that certain groups of the electric valves are associated with particular phase windings of the rotor windings 3. For example, it is to be noted that electric valves 8—10 are connected to transmit current to the lower or vertical phase winding 3 and that electric valves 17—19 are connected to transmit current from this phase winding. In like manner, the other groups of electric valves are associated with the other phase windings of the rotor windings 3.

I provide a plurality of excitation circuits 32—49, associated with electric valves 8—25, respectively, and which energize the associated control members conjointly in accordance with an electrical condition such as the voltage of the circuit 4 and in accordance with an electrical condition such as the voltage or the current of the rotor windings 3 of induction machine 1. The excitation circuits 32—49 are purely electrical in nature and are similar in construction and arrangement and, for the purpose of facilitating the description thereof, excitation circuit 32 associated with electric valve 8 will be considered in particular. Excitation circuit 32, for example, includes a device such as a transformer 50 having a primary winding 51 and a secondary winding 52 for introducing in the excitation circuit a periodic voltage or an alternating voltage which varies in accordance with the voltage of supply circuit 4. A current limiting resistance 52a and a source of suitable negative biasing potential such as a battery 52b are connected in series relation with secondary winding 52 and control member 28. Primary winding 51 of transformer 50 is connected in parallel relation with a suitable impedance element such as a resistance 53. In order to establish across the terminals of resistance 53 a voltage which varies in accordance with the voltage of circuit 4 and in accordance with the slip frequency voltage of machine 1, I employ a control electric valve 54 which is preferably of the type employing an ionizable medium such as a gas or a vapor and which includes an anode 55, a cathode 56 and a control member 57. The anode-cathode circuit of the electric valve 54 is connected in series relation with the parallel connected primary winding 51 of transformer 50 and resistance 53. A current limiting resistance 58 may be connected in series relation with control member 57 of control electric valve 54. Any suitable source of negative biasing potential such as a battery 59 may be employed to impress a negative biasing potential on control members 57 of control electric valves 54. In order to energize transformers 50 of excitation circuits 32—49 in accordance with the voltage of the supply circuit 4 I employ a transformer 60 including primary windings 61 and secondary windings 62. Any conventional phase shifting device, such as a rotary phase shifter 63, may be interposed between the supply circuit 4 and transformer 5 and transformer 60 to control the phase of the alternating voltages impressed on primary windings 51 of transformers 50 through control electric valves 54 to control the amount of power transmitted between rotor windings 3 and alternating current circuit 4. The rotary phase shifter 63 may therefore be employed to control an operating condition such as the speed when machine 1 is operating as a motor, and may be employed to control the power generated by machine 1 when it is operating as a generator. While in the drawing the transformer 60 is shown as being energized from the circuit which energizes the stator windings 2 of machine 1, it is to be understood that I may employ any other alternating current circuit properly correlated in phase and frequency.

To introduce in the excitation circuits 32—49 periodic voltages which vary in accordance with the slip frequency voltage of the induction machine 1, I provide a frequency changing dynamo-electric machine 64. More specifically, the frequency changing machine 64 impresses on control members 57 of control electric valves 54 alternating voltages of a frequency corresponding to that of the rotor phase windings 3 of machine 1. The dynamo-electric machine 64 may be mechanically coupled to the rotor of machine 1 through a shaft 65 and includes a stationary core member 66 and is provided with a rotating winding 67 which is like the winding of a rotary converter. The winding 67 is provided with a set of polyphase alternating current terminals which are connected to slip rings 68 through suitable connections. The winding 67 is connected to be energized from the alternating current circuit 4 through transformer 5 and conductors 69. The frequency changing machine 64 is also provided with a commutator 70 having a plurality of segments 71 and associated brushes 72. The segments 71 are connected to the proper points of windings 67 in a manner similar to that employed in rotary converters. While for the purpose of explaining my invention I have shown the commutator 70 as comprising only six commutator segments, it is to be understood that the commutator 70 may be constructed with a much larger number of segments in order to effect the control required. For example, there may be about two or three hundred commutator segments, the actual number of course depending upon the design of the machine. As a means for controlling the phase of the alternating voltages produced by brushes 72, I provide any suitable arrangement such as a brush shifting mechanism including a brush holder 73 and a handle 74. The brush shifting arrangement permits the control of the power factor at which power is transmitted to or received from rotor windings 3. In addition, the power transmitted between rotor windings 3 and circuit 4 may be controlled by shifting brushes 72.

The operation of the embodiment of my invention diagrammatically illustrated in the single figure of the accompanying drawing will be explained by considering the dynamo-electric machine 1 when it is operating as a motor below synchronism. Under this condition of operation, power will be transmitted from the rotor windings 3 to the alternating current circuit 4 through the translating apparatus including electric valves 8—25 and transformer 5. When the dynamo-electric machine 1 is operating as a motor below synchronism, the electric valves 8—25 operate as a rectifier relative to the voltage of the rotor windings 3 of machine 1 and operate as an inverter relative to the voltage of the supply circuit 4.

Referring more particularly to the operation of the control circuits associated with electric valves 8—25, the control electric valves 54 therein are maintained non-conductive except at predetermined intervals which are established by the control system. Negative unidirectional biasing potentials are impressed on control members 57 of electric valves 54 by battery 59 through secondary windings 7 of transformer 5 and winding 67 of machine 64. Transformer 60 impresses on the anode-cathode circuits of the associated electric valve 54 a voltage of a frequency equal to the voltage of supply circuit 4. The frequency changing machine 64 generates polyphase alternating voltages of a frequency equal to the slip frequency of the machine 1, and these voltages are impressed on control members 57 of control electric valves 54. In this manner it will be understood that the transformers 50 are energized only when the anode-cathode voltages of control electric valves 54 are positive and only when the slip frequency voltage produced by the frequency changing machine 64 is of a polarity and magnitude sufficient to render the control electric valve conductive. Hence the conductivities of main electric valves 8—25 are controlled conjointly in accordance with the voltage of circuit 4 and the slip frequency of machine 1.

Since the core member 66 of the frequency changing machine 64 serves only as a path for the flux established by winding 67, it is understood that the frequency of the voltage produced by brushes 72 is that corresponding to the difference in speeds of the rotating field produced by winding 67 and the mechanical speed of the rotor windings 3. In other words, the frequency of the voltages produced by brushes 72 is equal to the slip frequency voltage of machine 1. Furthermore, when the machine 1 is operating at synchronism the machine 64 will operate as a rotary converter, effecting control so that unidirectional current is supplied to rotor windings 3 of machine 1 causing the machine 1 to operate essentially as a synchronous machine. The control arrangement permits the operation of the machine through synchronism.

By adjusting the rotary phase shifter 63, the phase of the alternating voltages impressed on the anode-cathode circuit of electric valve 54 is controlled to permit control of current established in the rotor windings 3. In this manner the net or effective impedance of the electric valve translating system may be controlled to control the speed of the machine 1 when operating as a motor. In like manner, the brushes 72 of the frequency changing machine 64 may be shifted to control the current in rotor windings 3 to control the speed of machine 1. In addition, the power factor at which power is transmitted between rotor windings 3 and circuit 4 may be controlled by shifting brushes 72. Of course, when the speed is controlled by shifting brushes 72, the power factor changes concomitantly. By the proper adjustment of phase shifter 63 and brushes 72, the speed of machine 1 and the power factor may be controlled independently.

While the above explanation of the operation of my invention has been concerned with the operation of the machine 1 as a motor below synchronism, it is to be understood that the electric valve control system may be adjusted to supply power to the rotor windings 3 to drive the machine above synchronism. Under this condition of operation, the electric valves 8—25 operate as a rectifier relative to the voltage of the alternating current circuit 4 and operate as an inverter relative to the rotor windings 3. The transition from sub-synchronous to synchronous and over-synchronous operation may be effected by the advancement in phase of the voltages supplied by transformer 60 and introduced in the excitation circuits 32—49 and by retardation of the slip frequency voltage of machine 64 by manipulation of brushes 72.

Furthermore, it is to be understood that my system is applicable to the control of induction generators. If the rotor windings 3 of induction machine 1 are driven by a suitable arrangement such as a prime mover, the electric valve translating system and the associated control equipment permit the operation of the machine 1 as an induction generator either above or below synchronous speed. Of course, it may be necessary to employ auxiliary equipment, such as capacitances or synchronous condensers, to supply the exciting current to the induction generator. When the machine 1 is operated as an induction generator above synchronous speed, power is transmitted from the rotor windings 3 to the circuit 4 through electric valves 8—25 and transformer 5, and when the machine 1 is operated as an induction generator driven below synchronous speed power is transmitted to the rotor windings 3 from circuit 4. In either case, the power generated by the machine 1 may be controlled by adjustment of either the rotary phase shifter 63 or brushes 72 of machine 64. The power factor at which the induction generator 1 operates may, of course, be controlled by adjustment of the angular position of brushes 72 of machine 64 or by the adjustment of phase shifter 63.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifica-

What I claim as new and desire to secure by Letters Patent of the United States, is:

1. In combination, an alternating current circuit, a dynamo-electric machine of the induction type having an inducing winding connected to said circuit and having an induced winding, electric translating apparatus connected between said circuit and said induced winding for transmitting power therebetween and comprising a plurality of electric valve means each having a control member for controlling the conductivity thereof, and an excitation system for energizing the control members comprising a single dynamo-electric machine responsive to the speed of said first mentioned machine for producing periodic voltages of a frequency equal to the slip frequency of said first mentioned machine, means for producing periodic voltages of a frequency corresponding to that of said alternating current circuit, and purely electrical means responsive to said first mentioned and said second mentioned periodic voltages to impress voltages on the control members of said electric valve means to render said electric valve means conductive in a predetermined order and in accordance with the voltage of said alternating current circuit and the voltage of said induced winding.

2. In combination, an alternating current circuit, a dynamo-electric machine of the induction type having a stator winding connected to said circuit and having a rotor winding, electric translating apparatus connected between said circuit and said rotor winding for transmitting power therebetween and comprising a plurality of electric valve means each having a control member for controlling the conductivity thereof, an excitation system for energizing the control members comprising a dynamo-electric machine responsive to the speed of said first mentioned machine for producing alternating voltages of a frequency equal to the slip frequency of said first mentioned machine, means for producing alternating voltages of a frequency corresponding to that of said alternating current circuit, means responsive to said first mentioned and said second mentioned alternating voltages to impress voltages on the control members of said electric valve means to render said electric valve means conductive in a predetermined order and in accordance with the voltage of said alternating current circuit and the voltage of said rotor winding, and means for controlling the phase of said second mentioned alternating voltages to control the current in said rotor winding.

3. In combination, an alternating current circuit, a dynamo-electric machine of the induction type having a stator winding connected to said circuit and having a rotor winding, electric translating apparatus connected between said circuit and said rotor winding for transmitting power therebetween and comprising a plurality of electric valve means each having a control member for controlling the conductivity thereof, an excitation system for energizing the control members comprising a dynamo-electric machine responsive to the speed of said first mentioned machine for producing alternating voltages of a frequency equal to the slip frequency of said first mentioned machine, means for producing alternating voltages of a frequency corresponding to that of said alternating current circuit, means responsive to said first mentioned and said second mentioned alternating voltages to impress voltages on the control members of said electric valve means to render said electric valve means conductive in a predetermined order and in accordance with the voltage of said alternating current circuit and the voltage of said rotor winding, and means for controlling the phase of said first mentioned voltages to control the power factor at which power is transmitted between said alternating current circuit and said rotor winding.

4. In combination, an alternating current circuit, a dynamo-electric machine of the induction type having a stator winding connected to said circuit and having a rotor winding, electric translating apparatus connected between said circuit and said rotor winding for transmitting power therebetween and comprising a plurality of electric valve means each having a control member for controlling the conductivity thereof, and an excitation system for energizing the control members comprising a single frequency changing dynamo-electric machine mechanically coupled to said rotor winding and being energized from said alternating current circuit to produce alternating voltages of a frequency corresponding to the slip frequency of said first mentioned dynamo-electric machine, means for producing alternating voltages of a periodicity corresponding to that of said alternating current circuit, and purely electrical means responsive to said first mentioned and said second mentioned alternating voltages to render said electric valve means conductive in a predetermined order and in accordance with the voltage of said alternating current circuit and the voltage of said rotor winding.

5. In combination, an alternating current circuit, a dynamo-electric machine of the induction type having an inducing winding connected to said circuit and having an induced winding, electric translating apparatus connected between said circuit and said induced winding for transmitting power therebetween and comprising a plurality of electric valve means each having a control member for controlling the conductivity thereof, a plurality of excitation circuits each associated with a different one of said electric valve means and each comprising means for producing an alternating voltage of a periodicity equal to that of said alternating current circuit, and a frequency changing dynamo-electric machine mechanically coupled to said induced winding and being energized from said alternating current circuit for introducing in said excitation circuits voltages of a frequency corresponding to the slip frequency of said first mentioned dynamo-electric machine to render said electric valve means conductive in a predetermined order.

6. In combination, an alternating current circuit, a dynamo-electric machine of the induction type having a stator winding connected to said circuit and having a rotor winding, electric translating apparatus connected between said circuit and said rotor winding for transmitting power in both directions therebetween and comprising a plurality of electric valve means each having a control member for controlling the conductivity thereof, a plurality of excitation circuits each associated with a different one of the control members and each comprising means for producing an alternating voltage of a periodicity equal to that of said alternating current circuit, and a frequency changing dynamo-electric machine mechanically coupled to said rotor winding for introducing in said excitation circuits a voltage of a frequency corresponding to the slip frequency of said first mentioned dynamo-electric machine to impress on the control members a resultant voltage to render said electric valve means conductive in a predetermined order and in accordance with the voltage of said alternating current circuit and in accordance with the slip frequency of said first mentioned machine, said frequency changing machine comprising an armature winding having alternating current terminals connected to said alternating current circuit and having a commutator and associated brushes for producing the voltage of slip frequency.

7. In combination, an alternating current circuit, a dynamo-electric machine of the induction type having a stator winding connected to said circuit and having a rotor winding, electric translating apparatus connected between said circuit and said rotor winding for transmitting power therebetween and comprising a plurality of electric valve means each having a control member for controlling the conductivity thereof, a plurality of excitation circuits each associated with a different one of said electric valve means and each comprising a control electric valve for energizing the associated control member conjointly in accordance with the voltage of said alternating current circuit and the slip frequency voltage of said machine, said control electric valves each having an anode, a cathode and a control member for controlling the conductivities thereof, means for energizing the anode-cathode circuits of said control electric valves in accordance with the voltage of said alternating current circuit, and a frequency changing dynamo-electric machine mechanically coupled to said rotor winding and being energized from said alternating current circuit for impressing on the control members of the control electric valves alternating voltages of a frequency corresponding to the slip frequency of said dynamo-electric machine.

8. In combination, an alternating current circuit, a dynamo-electric machine of the induction type having a primary winding connected to said circuit and having a secondary winding, electric translating apparatus connected between said circuit and said secondary winding for transmitting power therebetween and comprising a plurality of power electric valve means each having a control member for controlling the conductivity thereof, and an excitation system for energizing the control members comprising a dynamo-electric machine responsive to the speed of said first mentioned machine for producing periodic voltages of a frequency equal to the slip frequency of said first mentioned machine, means for producing periodic voltages of a frequency corresponding to that of said alternating current circuit, and control electric valves responsive to said first mentioned and said second mentioned periodic voltages to impress voltages on the control members of said power electric valve means to render said power electric valve means conductive in a predetermined order and in accordance with the voltage of said alternating current circuit and the voltage of said secondary winding.

ALBERT H. MITTAG.